(12) United States Patent
Vogel

(10) Patent No.: US 8,940,383 B2
(45) Date of Patent: Jan. 27, 2015

(54) BLOCKS OF WOOD AGGLOMERATE

(71) Applicant: Stephane Vogel, Le Vesinet (FR)

(72) Inventor: Stephane Vogel, Le Vesinet (FR)

( * ) Notice: Subject to any disclaimer, the term of this patent is extended or adjusted under 35 U.S.C. 154(b) by 0 days.

(21) Appl. No.: 13/716,552

(22) Filed: Dec. 17, 2012

(65) Prior Publication Data

US 2013/0104496 A1    May 2, 2013

Related U.S. Application Data

(63) Continuation of application No. 11/920,131, filed as application No. PCT/FR2006/001056 on May 11, 2006, now abandoned.

(30) Foreign Application Priority Data

May 12, 2005    (FR) ...................................... 05 04776

(51) Int. Cl.
| | | |
|---|---|---|
| C04B 16/02 | (2006.01) | |
| E04C 1/40 | (2006.01) | |
| B28B 1/52 | (2006.01) | |
| B28B 7/00 | (2006.01) | |
| C04B 28/02 | (2006.01) | |
| C04B 28/14 | (2006.01) | |
| C04B 40/02 | (2006.01) | |
| B28B 7/46 | (2006.01) | |
| E04B 2/02 | (2006.01) | |

(52) U.S. Cl.
CPC ................. *C04B 16/02* (2013.01); *B28B 1/525* (2013.01); *B28B 7/0044* (2013.01); *B28B 7/0097* (2013.01); *C04B 28/02* (2013.01); *C04B 28/14* (2013.01); *C04B 40/0259* (2013.01); *E04C 1/40* (2013.01); *B28B 7/46* (2013.01); *E04B 2002/0282* (2013.01)
USPC ................................ 428/156; 52/578; 404/46

(58) Field of Classification Search
USPC .................................. 428/156; 404/46; 52/578
See application file for complete search history.

(56) References Cited

U.S. PATENT DOCUMENTS

| | | | |
|---|---|---|---|
| 4,510,726 A * | 4/1985 | MacDonald, Jr. ........... 52/309.8 |
| 4,818,321 A * | 4/1989 | Shimizu et al. ............... 156/254 |
| 5,405,211 A * | 4/1995 | Halwani .......................... 404/46 |
| 5,569,426 A | 10/1996 | Le Blanc | |
| 6,077,966 A | 6/2000 | Matsumura et al. | |
| 2002/0053300 A1 | 5/2002 | Beckenhauer | |
| 2009/0087621 A1 | 4/2009 | Vogel | |

FOREIGN PATENT DOCUMENTS

| | | |
|---|---|---|
| CH | 611 550 | 6/1979 |
| DE | 100 46 387 | 5/2002 |
| EP | 1 057 601 | 12/2000 |
| FR | 2 680 336 | 2/1993 |
| FR | 2 700 162 | 7/1994 |
| JP | 2000-95553 | 4/2000 |
| WO | 85/03700 | 8/1985 |

(Continued)

*Primary Examiner* — Brent O'Hern
(74) *Attorney, Agent, or Firm* — Nixon & Vanderhye P.C.

(57) ABSTRACT

The invention relates to compressed blocks of wood agglomerate, comprising wood particles and a hydraulic binder, produced by a method in which an initial mixture comprising wood particles and a hydraulic binder is held under pressure for the duration of the hardening of the binder. The invention further relates to a method for production of said blocks and the use thereof in particular, as construction elements for buildings.

9 Claims, 12 Drawing Sheets

(56) References Cited

FOREIGN PATENT DOCUMENTS

| WO | 90/15205 | 12/1990 |
| WO | 92/17416 | 10/1992 |
| WO | 95/32161 | 11/1995 |

* cited by examiner

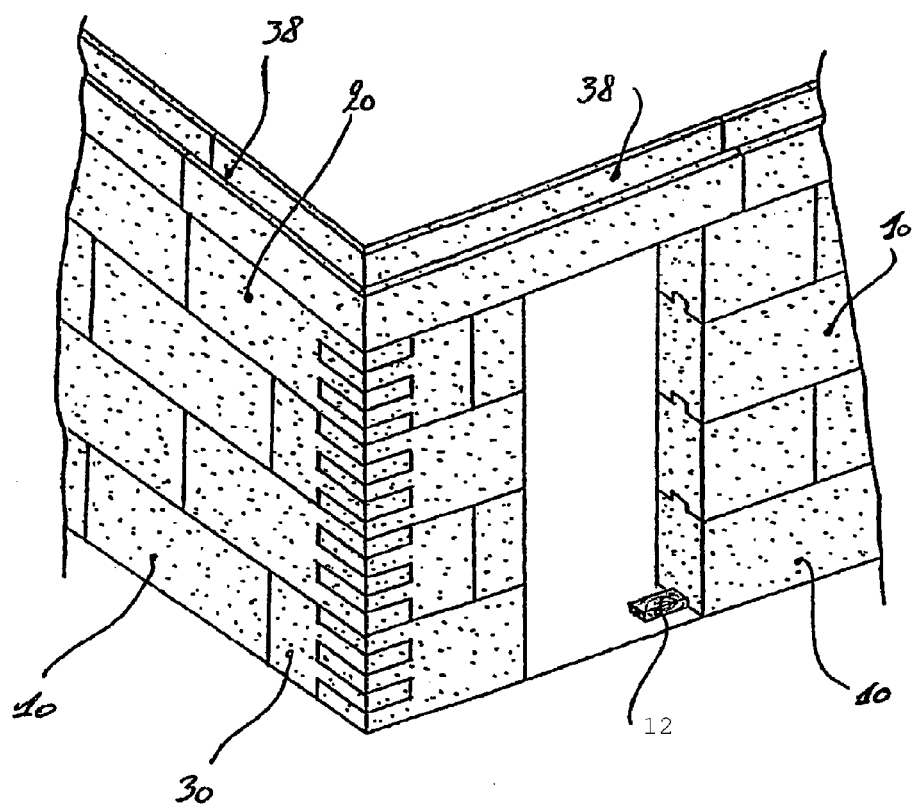

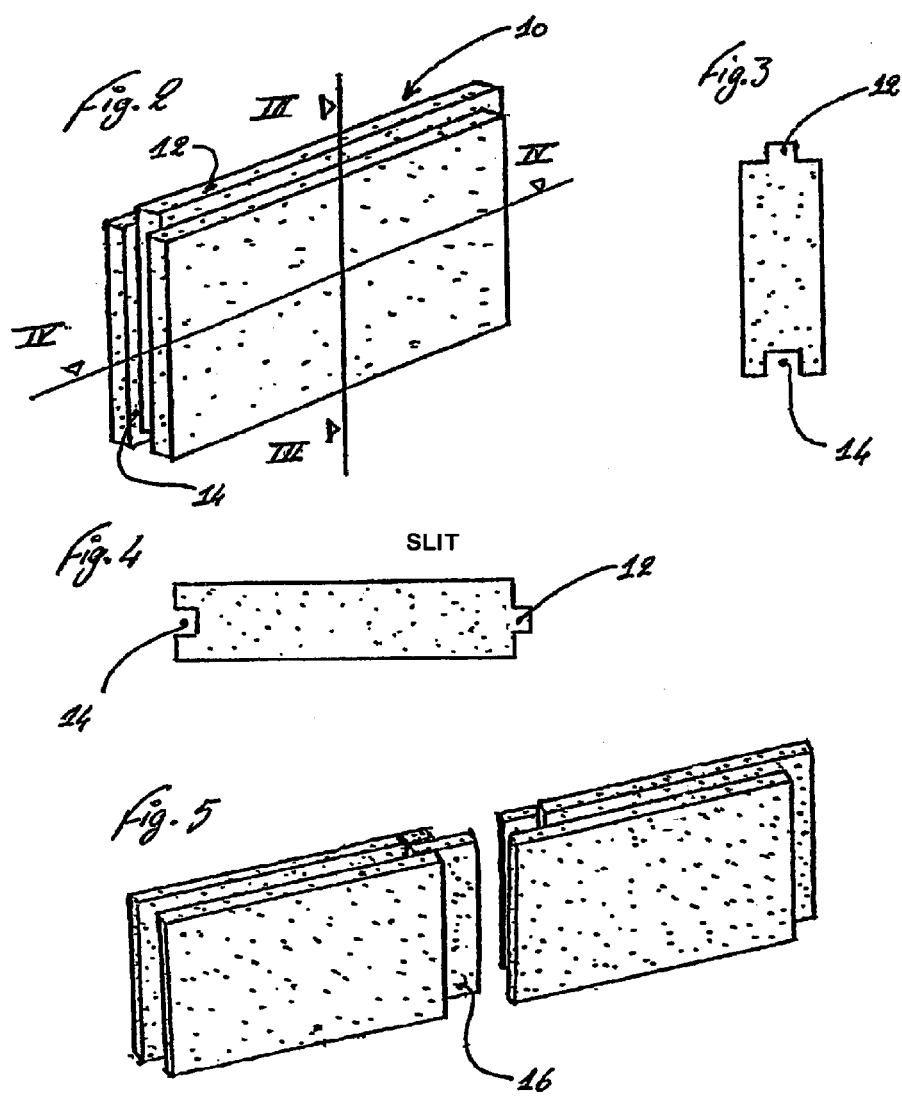

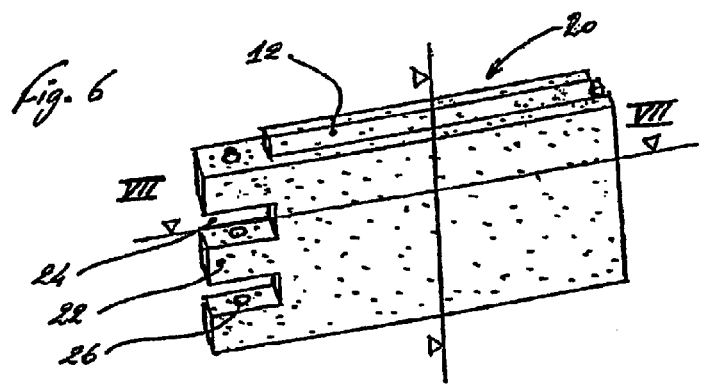
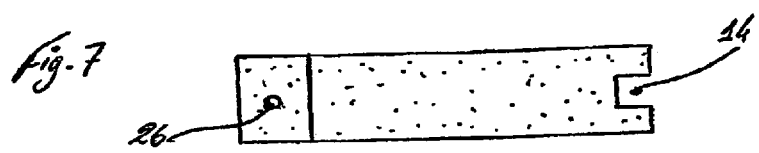
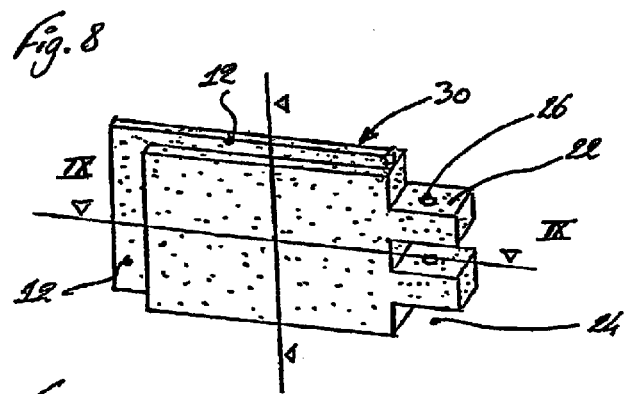
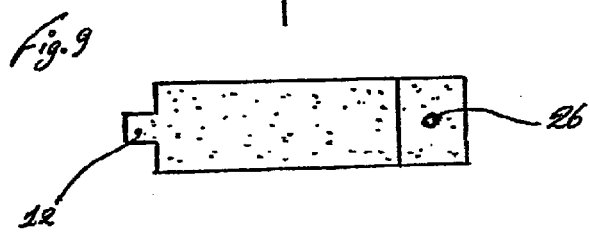

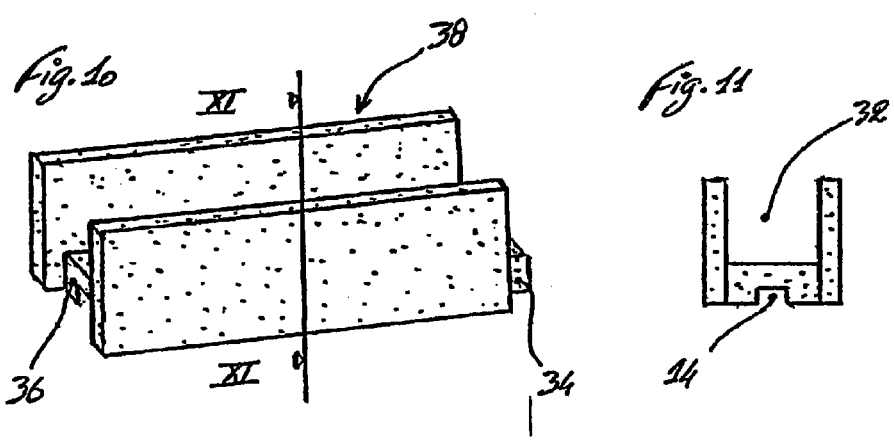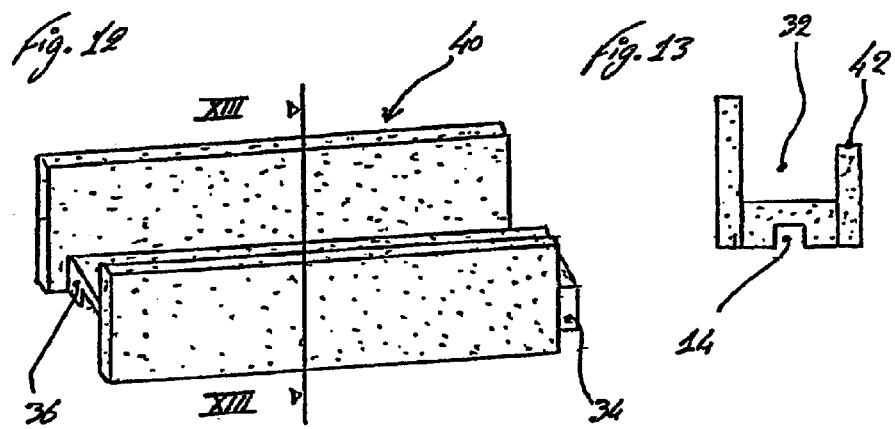

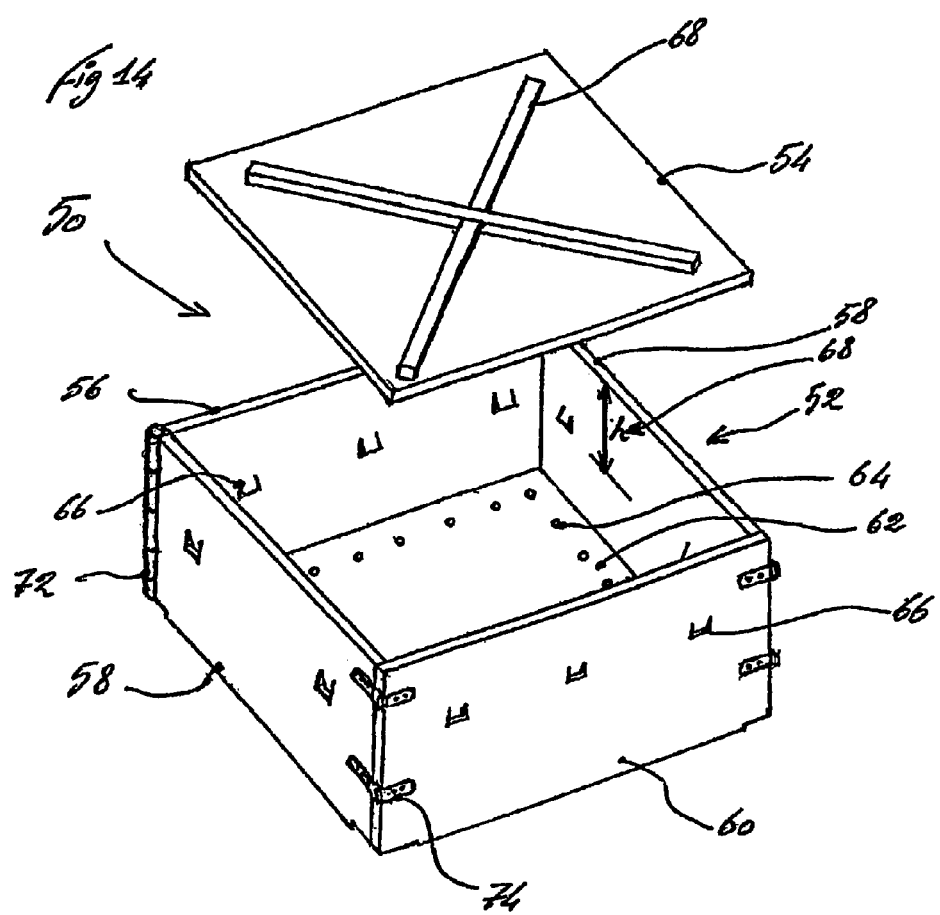

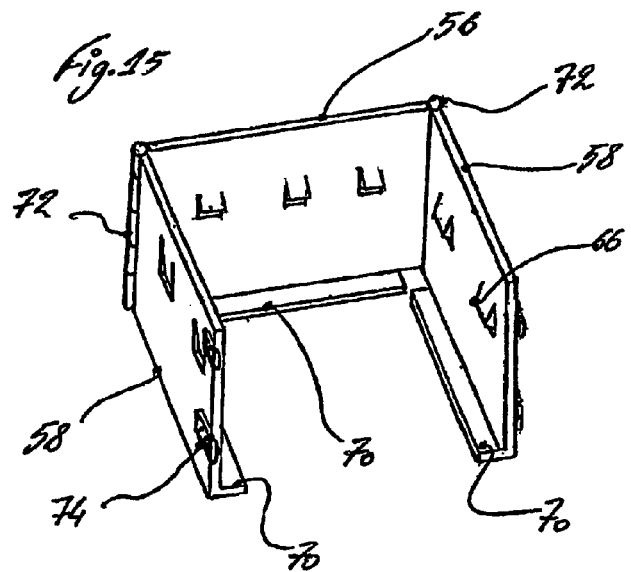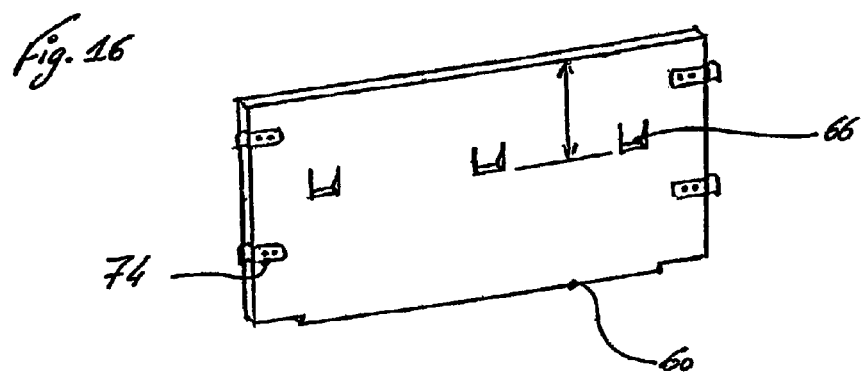

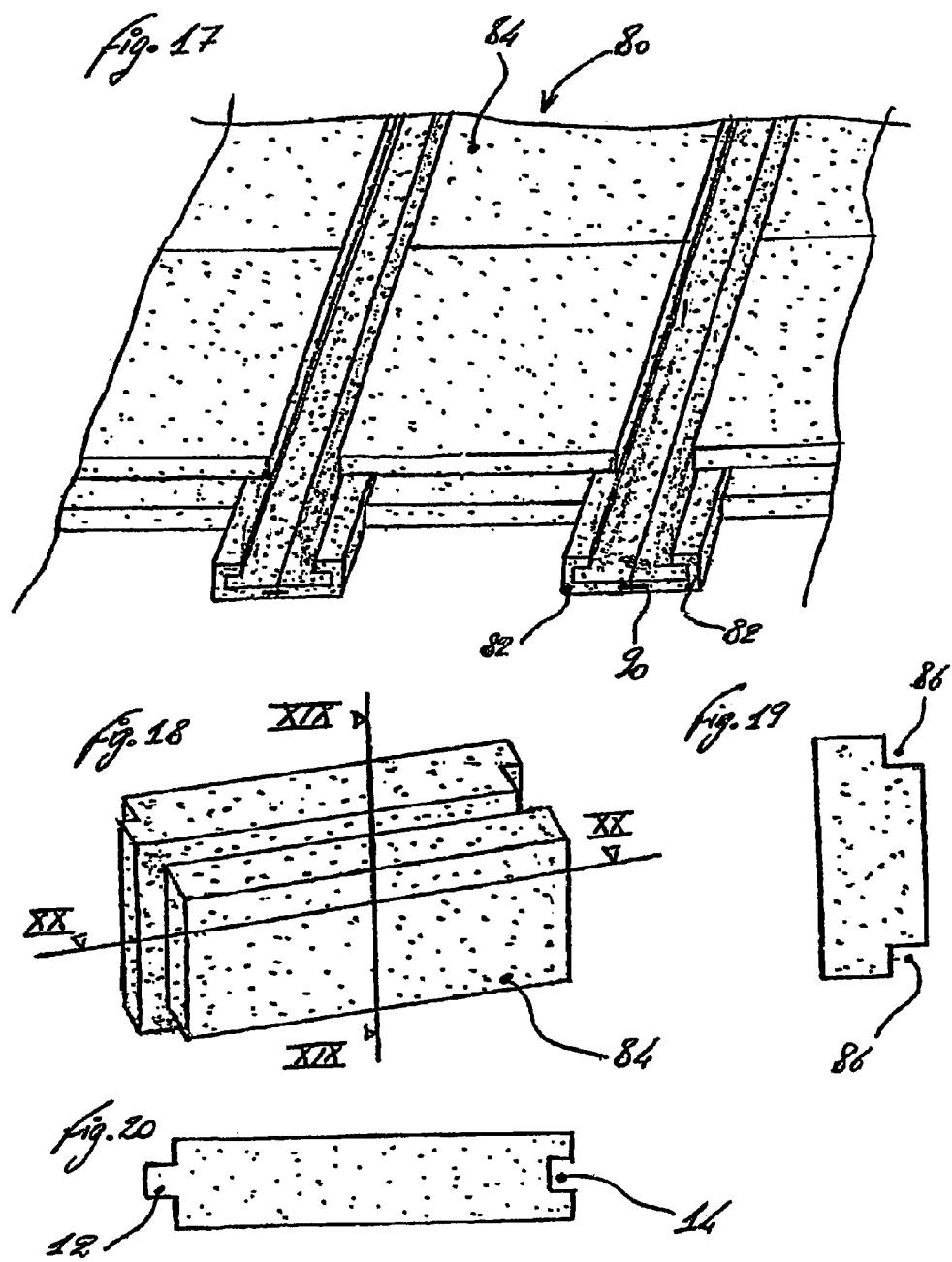

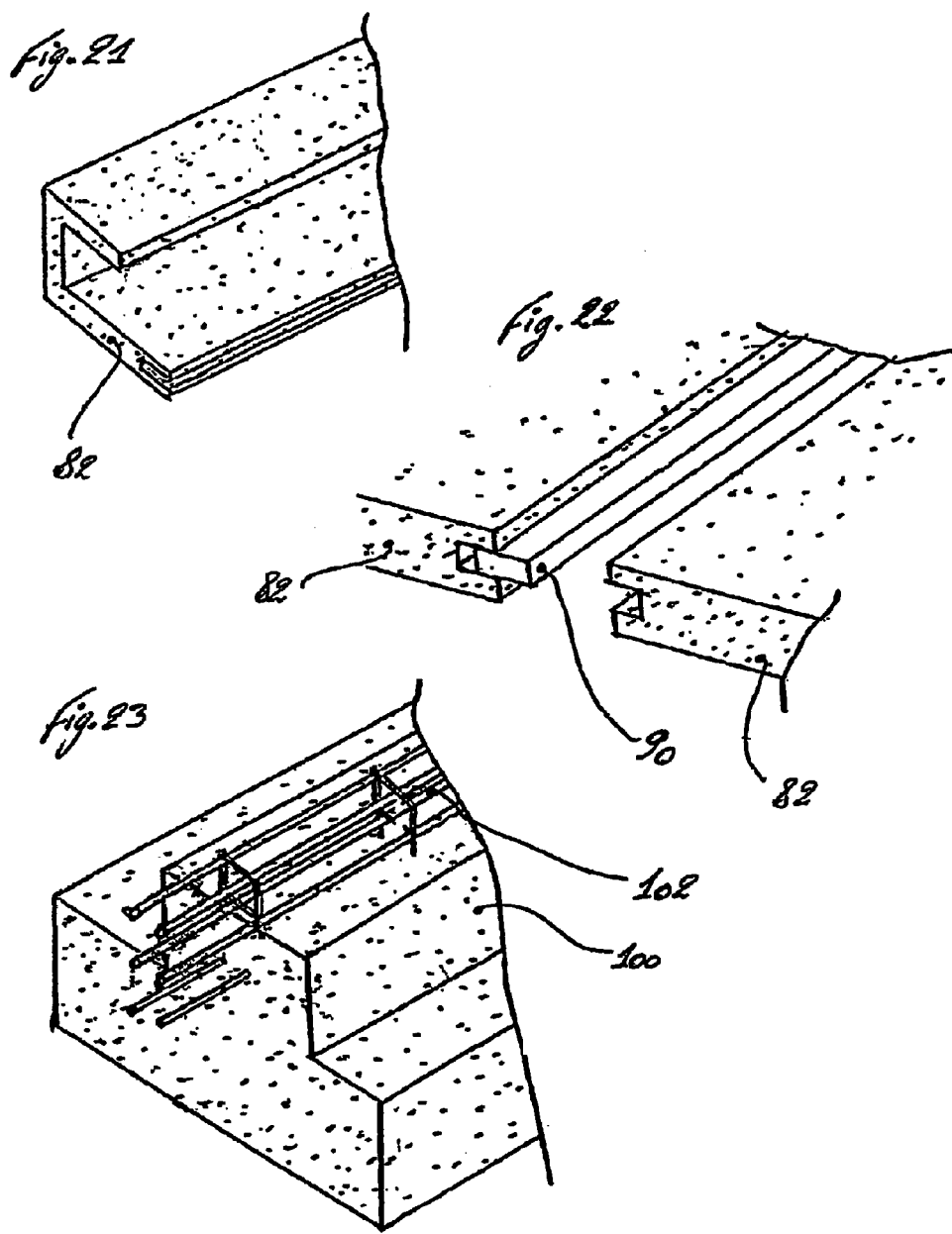

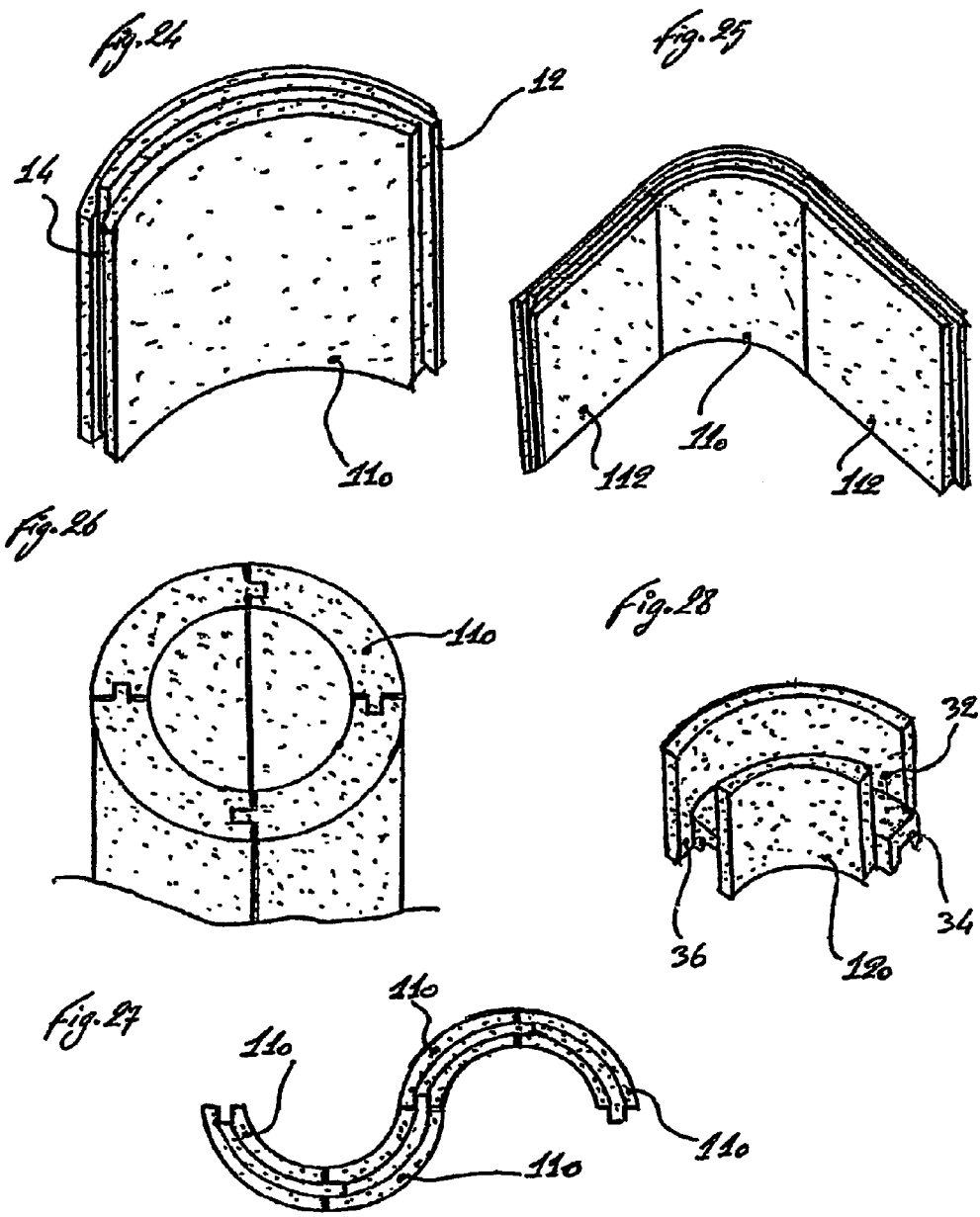

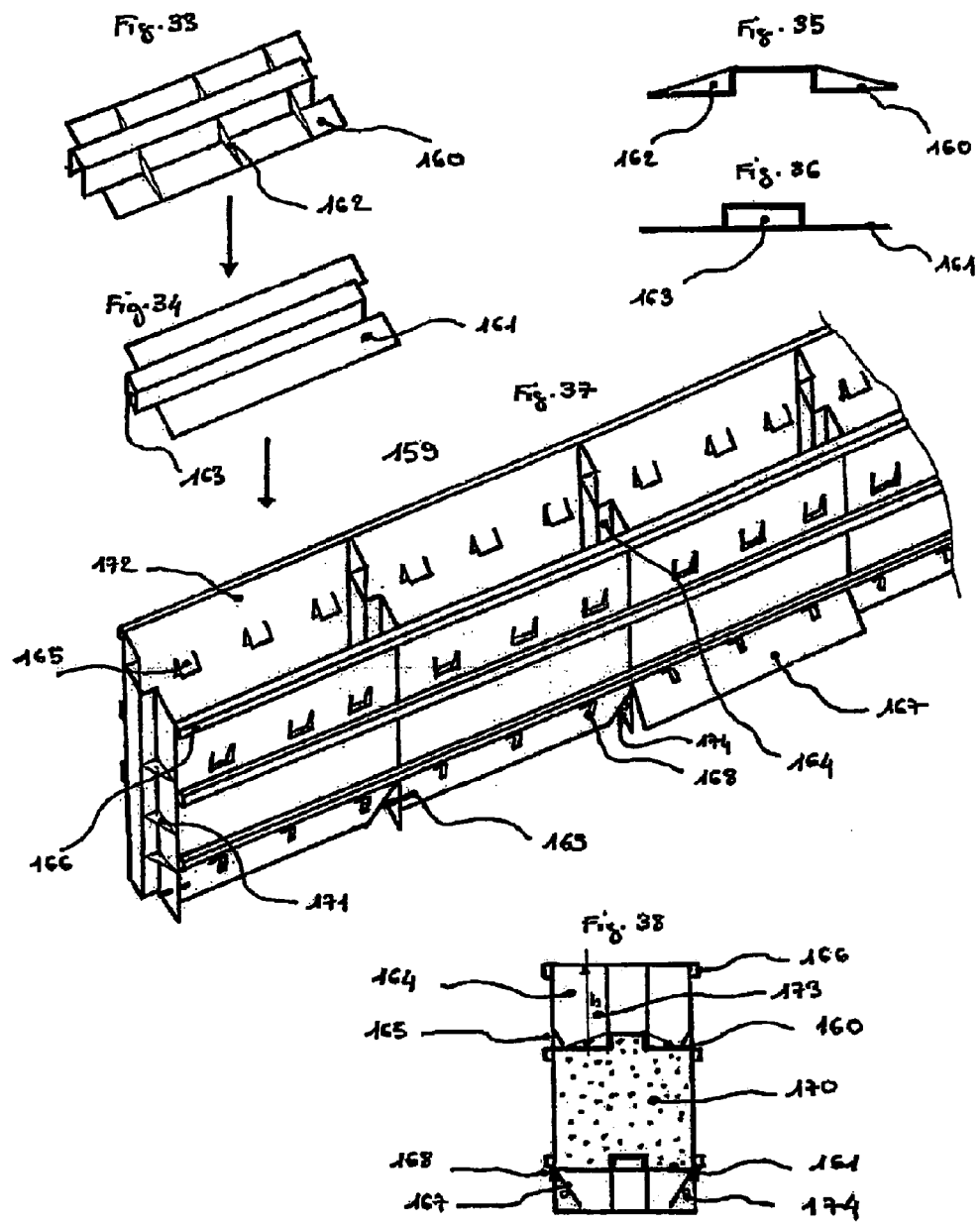

BLOCKS OF WOOD AGGLOMERATE

This is a continuation of application Ser. No. 11/920,131 (abandoned), filed May 2, 2008 (published as US 2009-0087621 A1), which is a U.S. national phase of International Application No. PCT/FR2006/001056 filed 11 May 2006, which designated the U.S. and claims priority to FR 0504776 filed 12 May 2005, the entire contents of each of which are hereby incorporated by reference.

The present invention relates to blocks of wood agglomerate allowing the making of constructions by an assembly device, and a process for manufacturing these blocks.

It is known to use granulates of wood of reduced dimension to make blocks used for building construction by moulding, by agglomerating them by a hydraulic binder, for example cement.

Making such blocks is described in the document FR-A-2700162 which presents a process for preparation of granulates of wood and agglomeration especially for reducing the size spreads of agglomerated blocks subjected to variable climatic conditions. This process also provides adding neutral mineral filler such as sand to improve the dimensional stability of the block.

Preparation of the granulates is complex and pushes up manufacturing costs. The disadvantage of the contribution of mineral filler especially increases the density of the material and the weight of the blocks and decreases the effect of the advantages brought by the wood present in a reduced proportion in the composite obtained, inter alia thermal insulation qualities.

Other agglomerate materials containing wood are mentioned in the literature.

Therefore, the application WO90/15205 relates to agglomerate elements comprising fibres, cement and a substantial quantity of recovered sludge (up to 45%). The blocks thus constructed are hollow, have no significant resistance, and are intended essentially for making formwork.

The application WO85/03700 relates to agglomerate materials comprising wood, cement and silicon dioxides. These materials have low density, resulting especially from the application of selective pressure, and are intended essentially for making panels. Also, the addition of silicon dioxides adds substantial weight to the material and makes it as heavy as concrete.

The application FR 2 680 336 relates to the fabrication of cellular pallets in agglomerates. It once again concerns low-density materials, whereof the composition is not precise, and which are not adapted to usage in the construction field.

The application EP 1 057 601 relates to a process for manufacturing a case of an eased frame by moulding under pressure of a mixture of wood, cement and inert chemical agent. The aim of this application is essentially a moulding device, but it provides no detail on the composition of the material. Also, the pressure applied is partial and does not allow the cement to harden, such that the moulded element is not solid and fragile. In addition, the presence of an inert chemical agent induces the risk of pollution.

The application CH 611 550 mentions the manufacturing of decorative panels utilising a wood agglomerate. The aim of this application is essentially a moulding device, but it provides no detail on the composition of the material.

Therefore, in the prior art there is no material in wood agglomerate which is adapted to use in the construction field. Earlier documents focus essentially on fragile agglomerates, or low densities, intended for making panels or formwork, but not adapted to making carrier elements.

The aim of the present invention especially is to avoid these disadvantages and to provide a simple, efficient and economical solution to the problem of making a composite material providing blocks of wood agglomerate with a strong proportion of wood and having certain characteristics close to those of raw wood.

It proposes to this end a block of compressed wood agglomerate, comprising particles of wood and a hydraulic binder, and having advantageously a high density. The blocks of the invention are advantageously obtained by a process in which an initial mixture comprising particles of wood and a hydraulic binder is maintained under pressure throughout the hardening of the binder. The blocks of the invention present excellent mechanical properties, especially in terms of resistance to compression, water and fire, and are well adapted to use as construction element. These blocks are particularly advantageous relative to existing materials, such as concrete, especially due to their reduced weight.

The blocks of the invention preferably have a density greater than approximately 500 $kg/m^3$, typically greater than approximately 600 $kg/m^3$, preferably approximately 800 $kg/m^3$.

In addition, the blocks of the invention are preferably prepared from a mixture comprising at least 75% approximately in volume of dry matter, of particles of wood, preferably from 75% approximately to 95% approximately, typically from 80 to 95%.

Also, the blocks of the invention are advantageously resistant to pinching compression greater than 3 mPa, typically exceeding 10 mPa, for a 5 $cm^3$ block.

The blocks of wood agglomerate are preferably produced from a mixture comprising, for a total of 100% representing the volume of dry matter, from 75% to 95% approximately of particles of wood and from 5% to 25% approximately of hydraulic binder, and a quantity of water between 10% and 30% of the total volume of dry matter.

The hydraulic binder used can be based on cement, lime or plaster, preferably based on cement. In this respect, it is possible to use any type of cement available commercially, such as for example standard cements (especially cement 32/5 cpj) or any other quality of cement.

In a preferred embodiment of the invention, the particles of wood comprise wood chips, optionally in a mixture with vegetable fibres. These can especially be thin wood chips, for example shavings made by the cutting tools of machines tools. Advantageously, the particles of wood originate from clean wood, and are essentially devoid of bark, sapwood and/or sap. The particles of wood preferably come from resinous wood (such as pine, fir, larch) or white wood (such as birch, beech, poplar, maple, etc.). Mixtures of particles of wood coming from different trees can naturally be used.

In a particular embodiment, a proportion of the particles of wood is composed of vegetable fibres. So, in particular blocks according to the invention the volume of wood is reduced between 5% to 25% and compensates for the same percentage by the contribution of vegetable fibres, for example of hemp, flax type, etc. The vegetable fibre of hemp is more particularly utilised, since it also has a fungicide and natural insecticide property, and is non chemical.

Accordingly, in a particular embodiment, the blocks of wood agglomerate are produced from a mixture comprising, for a total of 100% representing the volume of dry matter, from 50% to 90% approximately of wood chips, from 5% to 25% approximately of fibre vegetable and from 5% to 25% approximately of hydraulic binder, and a quantity of water between 10% and 30% of the total volume of dry matter.

In a particular embodiment the block also contains one or more adjuvants for adapting or improving the properties of the blocks. Particular examples are adjuvants for dyeing, acceleration or retarding of hardening of the binder, moisture-proofing, fireproofing, fungicide or insecticide treatment, liquefaction of the mixture, faster hardening, obtaining a high-performance mixture, fibres reinforcing the block agglomerate or a mineral filler. Any adjuvant utilisable in concrete can be employed in the present invention.

The blocks of the invention can have a varied form and thickness, according to the desired use (load-bearing wall, panel, floor, roofing, beam, urban or residential furniture, etc.).

An essential advantage of the block agglomerate according to the invention is that it contains a high proportion of wood, thanks to the pressure being maintained, producing a dense material with relatively little binder. It therefore has insulation qualities similar to those of raw wood utilised at the start, as well as good mechanical resistance which makes it ideal for construction of load-bearing structures used in buildings.

A particular object of the invention is thus a compressed block of wood agglomerate, comprising particles of wood and a hydraulic binder, obtained by a process in which an initial dry mixture comprising particles of wood and a hydraulic binder is humidified (by water) then poured into a mould and kept under pressure as the binder hardens.

Another object of the invention is a process for preparation of a block of wood agglomerate, comprising steps consisting of forming pouring into a mould a mixture comprising particles of wood and a hydraulic binder, humidified by water, then applying and maintaining the mixture under pressure during the whole period of hardening of the binder.

The initial mixture preferably comprises, for a total of 100% representing the volume of dry matter, from 75% to 95% approximately of particles of wood, from 5% to 25% approximately of hydraulic binder, and a quantity of water between 10% and 30% of water of the total volume of dried materials. Also, as indicated earlier, the mixture can contain one or more adjuvants selected for example from adjuvants for dyeing, acceleration or retarding of binder hardening, moisture-proofing, fireproofing, fungicide or insecticide treatment, liquefaction of the mixture, faster hardening, obtaining a high-performance mixture, fibres reinforcing the block agglomerate or a mineral filler.

The pressure applied to the mixture can be adapted by the specialist, according to the properties and desired use. In a particular variant of embodiment it is less than 1 mPa approximately, preferably less than 0.8 mPa approximately, and can be for example 0.1 mPa.

An advantage of the invention is that this process is simple to implement, since it does not requires complex physical or chemical processing which would increase costs and time of use. The fact of mixing the ingredients dry, prior to adding water, likewise constitutes an advantageous and important aspect of the process, producing particularly resistant blocks.

In the storage phase the pieces or the moulds can be placed in a hardening chamber to accelerate drying and thus gain time.

The mixture can be moulded in moulds having various shapes and dimensions. The blocks of wood agglomerate are preferably moulded in moulds comprising a cover serving as pressing and the mould comprises blocking means of the cover at a determined height. This blocking means of the mould can comprise tabs blocking the cover by clipping. Lateral faces of the mould can open to release the cover, with pivoting means and fixing means enabling assembly of these lateral faces.

Advantageously, the mould comprises holes at its base.

According to a particular mode, multiple moulds are used, producing several blocks in parallel.

According to a variant, the block of wood agglomerate constitutes a partition element comprising at its periphery tongues or grooves to ensure binding with juxtaposed blocks.

The partition element can be flat. It can comprise on one of its side edges slots which nest with slots of another flat element.

The flat partition element can comprise two grooves made on an edge of two lateral opposite faces.

According to another variant, the partition element can be curved.

According to another variant, the partition element comprises in its upper part a longitudinal channel which continues other horizontally juxtaposed elements with the channel.

The block of wood agglomerate can be a long element forming a hollow beam to be filled by a binder.

By way of variant, the block of wood agglomerate can constitute a long element forming a beam comprising a longitudinal reinforcement inserted in the wood agglomerate.

The block of wood agglomerate can constitute a lengthy piece of minimal thickness having a transversal section in an arc of a circle forming an arch.

The block of wood agglomerate can constitute an upper or lower piece of the arched piece, its contour comprising one arc or arcs of a circle adjusting on this arched piece.

The block of wood agglomerate can constitute a lengthy piece comprising tenons laterally and end notches for adjusting with the arched pieces, and for forming floor bins.

Accordingly, a particular object of the invention is the use of a block such as defined earlier as a construction element in the building field.

The invention will be better understood and other characteristics and advantages will emerge more clearly from the followed detailed description given by way of example and done in reference to the attached diagrams, in which:

FIG. 1 is a view of a part of a building constructed with blocks according to the invention;

FIG. 2 is a view of a standard block,

FIGS. 3 and 4 are sectional views of FIG. 2 along planes III and IV;

FIG. 5 shows a possible assembly between two standard blocks;

FIG. 6 shows an angled block,

FIG. 7 is a sectional view of FIG. 6 according to the plane VII;

Figure 29:
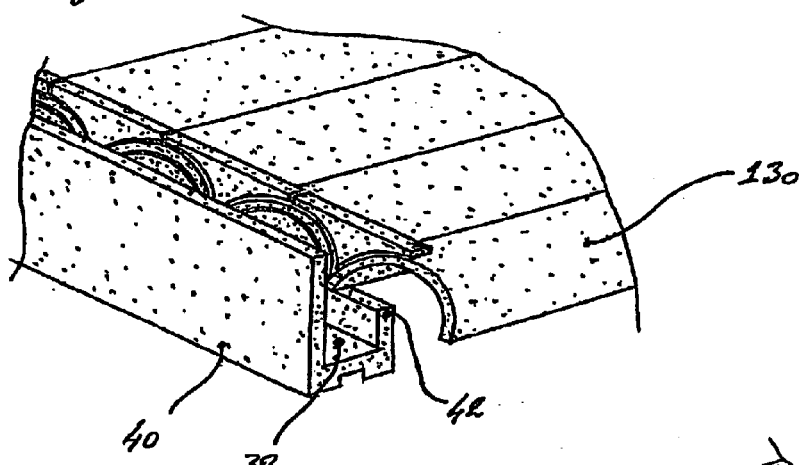
Figure 30:
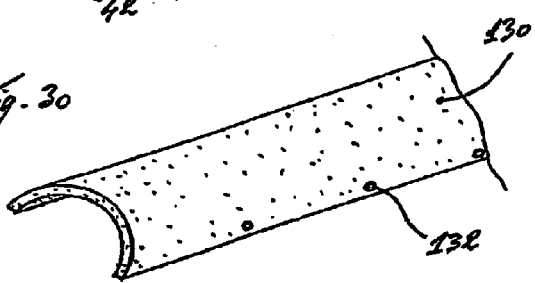
Figure 31:
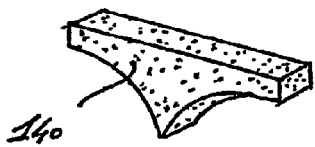
Figure 32:
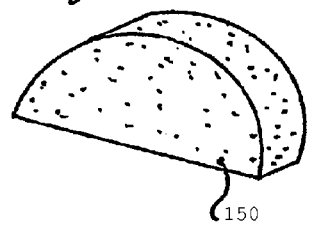

FIG. 8 has an angled block according to a variant,

FIG. 9 is a sectional view of FIG. 8 according to the plane IX:

FIG. 10 shows a linking block,

FIG. 11 is a sectional view of FIG. 10 according to the plane XI;

FIG. 12 shows a linking block with integration of the floor,

FIG. 13 is a sectional view of FIG. 12 according to the plane XIII;

FIG. 14 shows a mould for making blocks of wood agglomerate;

FIGS. 15 and 16 show details of the mould of FIG. 14;

FIG. 17 shows a floor made of blocks of wood agglomerate;

FIG. 18 shows a block of the roughcast type,

FIGS. 19 and 20 are sectional views according to planes XIX and XX;

FIG. 21 shows a semi hollow beam,

FIG. 22 shows the assembly of two semi beams;

FIG. 23 shows a full beam;

FIG. 24 shows a curved block,

FIGS. 25 to 27 show assemblies comprising curved blocks;

FIG. 28 shows a curved linking block;

FIG. 29 shows a floor of wood block agglomerate comprising arched blocks,

FIGS. 30 to 32 show elements of the floor according to FIG. 29; and

Figure 39:
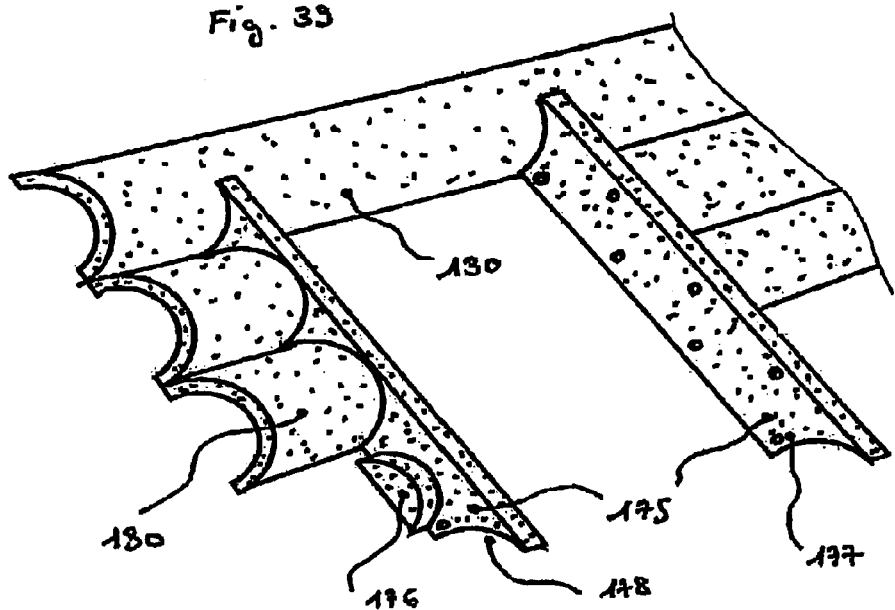
Figure 40:
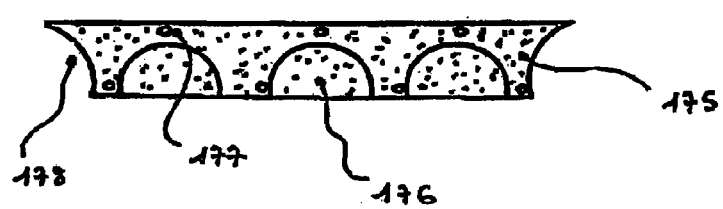

FIG. 33 shows a multiple mould for making blocks of wood agglomerates;

FIGS. 34 to 38 show details of multiple moulds of FIG. 33;

FIG. 39 shows a floor bin of arched blocks and bin blocks;

FIG. 40 shows one of the elements of the floor bin of FIG. 39.

FIG. 1 schematically shows parts of partitions of a building constructed from blocks made according to the invention. These blocks form load-bearing elements joined together to produce a rigid structure capable of supporting the weight of an edifice. The partitions comprise as base elements standard blocks 10, angled blocks 20, semi angled blocks 30, and linking or lintel blocks 38.

FIGS. 2 to 13 detail these different blocks comprising elements enabling binding. The standard block 10 shown in FIGS. 2 and 3 is a flat element which is overall parallelepiped, wherein the two large faces constitute the internal and external faces of the load-bearing partition, the thickness of this block relatively reduced relative to its height and its width represents the thickness of the partition, generally between 5 and 20 centimeters.

A longitudinal tongue 12 is centred on the upper face as well as on a lateral face, a longitudinal groove 14 is also cantered on the lower face as well as on the other lateral face. The tongues 12 have a height and width slightly less than respectively the depth and the width of the grooves 14 so as to enable nesting of these tongues 12 in the grooves 14 for guiding the pieces relative to one another, with lateral clearance and clearance according to depth to allow interposition of an adhesive film deposited during assembly of the elements.

In addition, the tongues 12 and the grooves 14 can have slightly inclined lateral faces, the width of these elements reducing moving away from the face of the block, and the external edges of the tongues 12 or internal edges of the grooves 14 can be rounded to facilitate demoulding these blocks after hardening of the material.

In general, the base elements are assembled horizontally following one another in the same direction. For certain particular cases these elements can be placed opposite, two lateral faces comprising grooves 14 being opposite one another. The blocks 10 are assembled as shown in FIG. 5 by a connecting blade 16 of identical thickness as a tongue and a width equal to twice the height of a groove, lodged simultaneously in the two grooves 14 opposite.

In a vertical plane, the elements are superposed with similar nesting of the upper tongues in the lower grooves of the block above. The lower groove of the first row of blocks 10 is nested on a horizontal mandrel fixed to the ground which keys this first row by ensuring its positioning.

FIGS. 6 and 7 show angled blocks 20, and FIGS. 8 and 9 show semi angled blocks 30. The angled block 20 is similar to a standard block, but the lateral face opposite that having a groove 14 comprises, according to its height, a succession of three slots 22 of a width substantially equal to the width of the intermediate hollows 24. The height of these slots 22 is substantially equal to the thickness of the block 20. These slots 22 insert in complementary hollows 24 made on the lateral face opposite that having a tongue 12 of another semi angled block 30, these hollows 24 alternating with two slots 22. In this way, during assembly of the angled blocks 20 and 30, the entire volume between the internal and external faces of the partitions is filled.

To reinforce the bond of the two partitions forming the angle, a vertical rod is introduced after assembly of the angled blocks in vertical bores 26 situated at the centre of the slots 22 in the two series of blocks and semi angled blocks 20 and 30, the diameter of this bore enabling this rod to be coated by an adhesive to make a seal of the whole.

FIGS. 10 to 13 show blocks 38, 40 creating the horizontal linking of a partition or creating lintels placed above an opening. These blocks 38, 40 have a reduced height relative to standard blocks and a horizontally elongated shape. The lower face comprises a longitudinal groove 14 which receives the tongue of the upper face of the block situated below. The upper face forms a channel 32 following the length of the block, and is delimited by three relatively thin walls, the lower face and the two lateral faces.

The linking blocks 38, 40 are adjusted relative to one another by a tenon 34 located at the end of a block which nests in a mortise 36 situate at the other end of the following block. In this way, a continuous channel 32 is made on the circumference of a partition and by following the angles; in this channel bars and rods are deposited then a binder is poured, concrete for example, to complete the linking. A long linking block can be utilised to straddle an opening and create a lintel.

By way of variant, a particular linking block 40 can be used for integrating a floor. One of the side walls 42 of the linking block is not as high as the other, and this offset integrates the binding of a horizontal floor supported on the upper face of this side wall 42 by backfilling the difference in height. After pouring the binder in the channel 32, the linking creates the binding with the floor at the same time.

The process for making blocks is as follows. For a total of 100% representing the total volume of dry matter, a significant proportion of wood shavings representing a volume of the order of 75% to 95% is mixed with a hydraulic binder, such as cement, lime or plaster, the volume of dry matter of which is of the order of 5% to 25%. The mixture made dry is then humidified. In this respect, the dosage of water varies as a function of the nature of the shavings and the essence of the wood; it can be of the order of 10% to 30% of the total volume of dried matter.

In a particular embodiment, the process for making blocks is as follows. For a total of 100% representing the volume of wood, dry matter of the hydraulic binder and vegetable fibres, a proportion of wood chips representing a volume of the order of 50% to 90% and a proportion of vegetable fibres representing a volume of the order of 5% to 25% are mixed in a hydraulic binder, for example cement, lime or plaster, the volume of dry matter of which is of the order of 5% to 25%. The dosage of water varies as a function of the nature of the shavings and of the essence of the wood; it can be of the order of 10% to 30% of the total volume of dried materials (hydraulic binder, wood chips and vegetable fibre).

Then this humid mixture is poured into a mould and strongly compressed in a proportion by volume for example between 5% and 50%, to make the material highly compact. Under the effect of this strong pressure the majority of the residual air is eliminated, forming a compact wood agglomerate. Maintaining the pressure until the binder hardens is essential for keeping the compactness of the agglomerate, the shavings strongly compressed and interwoven into one another having a tendency to stand up again by elasticity as much as the binder has not set the final form. It is the strong maintained compression which yields a dense material contributing significant characteristics, especially good punching compression performance, with a value greater than 3 mPa, typically of the order of 3 to 12 mPa, for example greater than 5, 6, 7 or 8 mPa, measured on a 5 cm³ block. This value is equal to that of the wood according to their essence, thermal insulation capability close to that of wood, fire resistance improved by the considerable density and by coating the wood with the binder.

Furthermore, the faces of the block strongly compressed against the walls of the mould are practically smooth and follow reliefs which can be made on the walls, which makes blocks finished directly after demoulding with smooth faces comprising relief decor. These blocks have a density of between 500 and 1200 kg/m³, clearly less than that of blocks of concrete agglomerate, which makes handling them easier and reduces the intrinsic weight of the structures. Blocks each covering a larger partition surface to ensure faster assembly can also be made. Plus, just as for wood, these blocks can be cut, bored, and take nails or screws.

Also, different adjuvants can be added to accelerate or slow down hardening of the binder, dyeing of the material, its waterproofing, its fireproofing, fungicide or insecticide treatment, liquefaction of the mixture, for faster hardening or to obtain a high-performance mixture. Complements can be also added to reinforce the mechanical behaviour of the block, such as metallic fibres (ribbed steel, corrugated steel, stainless amorphous cast iron), synthetic fibres (glass, carbon, polypropylene fibres). Fibre optics giving a luminous effect can be added for decoration. A mineral filler such as sand or silica fume can be incorporated into the mixture to increase hardness of the block. However, the addition of such a filler is not a preferred embodiment, since it boosts the weight of the material which now becomes equivalent to concrete.

The fragmented incorporated wood preferably comes from the industries of joinery, cabinet-making or framework and constitutes the thin shavings left by the cutting tools of machine tools such as a planer, a router, a moulder, a slotter, a borer. These shavings are thus good quality, with neither bark nor sap, coming from clean and relatively dry wood. They require no processing or drying prior to use. These thin shavings impart a suppleness and good dimensional stability to the block.

FIGS. 14 to 16 illustrate an example of mould 50 utilised for making agglomerated blocks according to the invention. It comprises a base 52 of open parallelepiped shape on the top, which is closed by a cover 54, these different elements being made of sheet metal. The base 52 comprises a bottom 62 pierced with small holes 64 for evacuation of air and excess water in the material; this bottom is supported on lower rims 70 of the sides 56, 58, 60 formed by a fold in the sheet metal of the sides turned towards the interior of the base 52. The contour of the bottom 62 comprises chamfers turned towards the lower face of the bottom, which are adjusted on the radii formed by the folds of the sheet metal of the sides for proper support of the sheet of the bottom on the lower rims 70 of the sides.

At a height h 68 from the top of the base 52 is the lower end of elastic tabs 66 formed by cut-outs of the sheets of the sides 56, 58, 60, these lower ends retreating slightly towards the interior of the base 52. For compression of the material previously poured into the base 52 forming the mould, a press acts vertically on the cover 54 stiffened by ribs 68 descending to the base 52. After a descent from a height h which corresponds to the rate of compression selected for this material, the cover 54 repels the elastic tabs 66 towards the exterior to form its passage, then once arriving below, these tabs 66 resume their place by elasticity and complete locking of the cover 54 which can no longer rise. The pressure of the press can be relaxed, the cover 54 is put in place by clipping and maintains pressure as the binder hardens.

This manufacturing process with a mould 50 maintaining pressure by itself is particularly interesting, because after compression by the press the blocks whereof the binder is hardening are removed and stored in a wait area, freeing the press which can continue to compress the next moulds.

For demoulding of the block after hardening of the binder, the mould opens to release the block agglomerate. The lateral faces 58 of the mould are attached to the rear face 56 by hinges 72 and the front face 60 is attached to each lateral face 58 by two bolts 74. Once the binder hardens, the bolts 74 are opened, the front face 60 is released, the lateral faces 58 pivot on their hinges 72, thus releasing the cover 54 from the tabs 66, the block agglomerate is taken out and the mould can be reconfigured for subsequent moulding.

Based on the same principle comprising especially a fast blockage system of the face of the mould used for compression, by clipping for example, numerous forms can be made, such as for example angled blocks 20, 30, linking blocks 38, 40, or blocks 17 to 23.

Other examples for making blocks are given in FIGS. 17 to 23 which present agglomerated blocks utilised for making load-bearing floors. FIG. 17 shows a floor 80 comprising semi beams 82 assembled two by two symmetrically relative to a longitudinal vertical plane. FIGS. 21 and 22 detail this assembly, where the semi beams 82 have an overall flat U shape, the openings of the U are opposite one another, the lower wings join up and are adjusted by a blade 90 nested in grooves formed in each of these wings. The upper wings are shorter, and support blocks make a filling or roughcast 84 which comprise grooves 86 made on an edge of two opposite lateral faces and receiving these semi beams 82 to make a base of the flat floor 80.

The roughcasts 84 further comprise on their two other lateral faces a tongue 12 and a groove 14 to ensure the bond between them. Once the ensemble of roughcasts 84 is placed on the semi beams 82, a reinforcement, not shown here, is arranged in the hollow of the beams then a binder based on cement for example is poured in to fill these hollows, and this binder can then cover the whole floor to make a compression flagstone.

The semi beams 82 can be of a single length, or composed of several standard lengths placed end to end and arranged in staggered rows.

FIG. 23 shows as variant a pre-assembled beam 100. Its transversal section has the general shape of an inverse T, a longitudinal reinforcement 102 is integrated during pouring of the mixture based on wood chips, before compression to form a block agglomerate according to the invention. The upper part leaves part of the reinforcement 102 detached, and the latter protrudes beyond the roughcasts 84 and will be prise in the compression flagstone then poured.

FIGS. 24 to 27 show curved agglomerated blocks 110. Just as for the blocks plats 10, these curved blocks 110 have two large faces constituting the internal or external walls of a partition, but these faces are curved in a horizontal plane. The lateral faces each comprise a tongue 12 or a groove 14, while the upper face comprises a tongue 12 and the lower face a groove 14.

These curved blocks 110 can be assembled in a horizontal plane with flat blocks 112 on either side, the curved block forming a rounded angle between two plane partitions, as shown in FIG. 25. The curved blocks 110 can also be assembled by a series of four, the concave faces all turned to the same side, as shown in FIG. 26, to form a circular post. By way of complement, concrete can be poured inside this post with a vertical reinforcement to reinforce it.

Another possible assembly is shown by FIG. 27, in which the curved blocks 110 are arranged horizontally by series of two blocks turned in one direction followed by two blocks turned in the other direction. This forms a partition with corrugated shape which can serve for example to form an anti-noise wall.

FIG. 28 shows a block agglomerate 120 serving as linking above a curved block 110, its internal and external radii adjusting on those of the curved block. The linking block 120 comprises on its lower face a groove for receiving the upper tongue of the curved block 110 located below, a tenon 34 located at one end of the block nests in a mortise 36 located at the end opposite the following block, and in the same way a mortise 36 is shown at the other end. The top forms a channel 32 delimited by two relatively thin walls. The top of the internal wall can be lower to integrate the link of a floor, as for the linking block shown by FIGS. 12 and 13.

FIGS. 29 to 32 show a floor comprising a series of lengthy pieces of wood agglomerate 130 juxtaposed to one another, placed at their ends on the lower side walls 42 of a succession of linking blocks 40 forming part of the partitions. The lengthy pieces 130 cover the whole surface of the floor, and have a transversal section in an arc of a circle each forming a small arch of minimal thickness giving rigidity to the lengthy piece 130 and enabling it to be autoload-bearing. Linking holes 132 are made on the flanks of the arched pieces 130 to tie these pieces together by bolts, for example, to ensure alignment of these pieces and improve the rigidity of the ensemble. The total height of the arched piece 130 makes up the height difference of the lower lateral wall 42 relative to the other side wall of the linking block 40 at least in part. Upper 140 or lower 150 elements are placed at a transversal orientation at the end of the lengthy arched pieces 130 to laterally close the channel 32 of the linking blocks 40.

The upper element 140 has symmetrically on its lower face a contour forming two arcs of a circle each covering half of an arched piece 130; the top of these elements 140 are aligned and form a horizontal plane placed higher than the top of the arched pieces 130. The lower element 150 nests under an arched piece 130, while its lower part aligned with that of the arched piece 130 in the same horizontal plane rests on the side wall 42 of the linking block 140.

This auto-load-bearing floor can be utilised as such, or can serve as sub-basement to a concrete flagstone poured above to produce a floor of greater resistance. In this case, the upper elements 140 are removed to enable connection between the concrete of the channel 32 and that of the flagstone. A longitudinal reinforcement can be inserted in the hollows formed between two arched pieces 130.

By way of variant, the floor created with the arched pieces 130 can receive reinforcement formed by a fabric of fibres, for example glass or carbon fibres, adhered directly on the upper or lower face of the arched pieces.

In addition, these hollows above between two arched pieces 130, such as those under an arch form clearances which allow wires or ducting for building equipment to pass through.

In general, blocks of wood agglomerates made according to the invention can comprise hollows to reduce the quantity of material utilised and the weight. They can also comprise bores following the thickness or surface grooves which extend end to end from one block to the other constitute passages for electric sheathing or ducting, for example.

FIGS. 33 to 38 show an example of multiple moulds 159 for making agglomerated blocks according to the invention. It comprises two parallel sides 172 and two other parallel sides 164 forming a parallelepiped open to the bottom for passage of the bottom 161, and open to the top for passage of the cover 160. These different elements are typically made from sheet metal. The sides 172 comprise elastic tabs 165 formed by the cut-outs of the sheet metal, of which the lower end is located relative to the top at a height 173. In their lower part the sides 172 comprise an element 167 pivoting on an axis determined by the hinges 168. The sides 172 comprise reinforcements 166 for preventing deformation from pressing. The sides 172 join with the sides 164 and are held by fixing or welding. The sides 164 comprise in the angles in the lower part a hole for placing a key 169 serving block the pivoting element 167. The end sides 164 of the mould can receive reinforcements 171 to prevent deformation to pressing. The bottom 161 comprises reinforcements 163 to prevent deformation to pressing. The bottom 161 descends by pressure between the sides 172 and 164, repels the elastic tabs 165 towards the outside to form its passage, butts against the pivoting elements 167 blocked by the keys 169. The material 170 to be compressed is then poured. The cover 160, which comprises reinforcements 162 to prevent deformation to pressing, has in turn descended by pressure between the sides 172 and 164 to compress the material 170 to a height h 173 corresponding to the selected rate of compression. The cover 160 repels the elastic tabs 165 towards the outside to form its passage then, once at the bottom, the tabs 165 resume their place by elasticity and effect locking of the cover 160 which cannot now rise. The pressure of the press can be released because the cover 160 is put in place by clipping and maintains pressure while the binder hardens.

This process de realisation with a multiple mould 159 maintaining the pressure by itself is particularly interesting since, after compression by the press, the blocks whereof the binder is hardening can be removed and stored in a waiting area, freeing the press which can continue to compress the next moulds. The multiple moulds 159 can be juxtaposed to one another to form plates.

For demoulding of the block after hardening of the binder, the keys 169 are withdrawn, releasing the elements 167 which pivot and thus release the bottom 161, the block 170 and the top 160, which can be knocked out by pressure between the sides 172 and 164. The mould can be reconfiguration for the next moulding.

Based on the same principle comprising especially a system for fast blockage of the face of the mould utilised for compression, by clipping for example, numerous forms can be made, such as for example angled blocks 20, 30, linking blocks 38, 40, or blocks 17 to 23.

FIGS. 39 to 40 show a floor bin comprising a series of lengthy pieces of wood agglomerate 130 juxtaposed to one another, attached to the piece of wood agglomerate 175 to execute a floor bin. This piece of wood agglomerate 175 for floor bin has lateral tenons 176 for the arched pieces of wood agglomerate 130 to rest above, at the ends of the notches 178 for adapting to the arched pieces of wood agglomerate 130, and fixing holes for keeping the whole by step bolts, for example.

Specific examples of blocks according to the invention were made and tested for their properties. The results of the A-D assays are provided below:

| Assay | Total volume of dry matter | | % of volume of water of total of dry matter | Compression resistance to punching |
|---|---|---|---|---|
| | Pine wood shavings | Cement 32.5 CPJ | | |
| A | 92% | 8% | 23% | 2 Mpa |
| B | 89% | 11% | 22% | 4.8 Mpa |
| C | 84% | 16% | 21% | 5.6 Mpa |
| D | 81% | 19% | 16% | 8.2 Mpa |

The invention thus produces blocks of wood agglomerate having resistance superior to Siporex and capable of attaining the resistance of a concrete block, while having a volume mass much less than that of concrete.

Durability assays were conducted with water. A block of 5 cm$^3$ was placed in total immersion in water over 2 months, and it was proven that there was no degradation of the material and no dimensional change.

Durability assays were likewise conducted by first immersing a block of 5 cm$^3$ in water for approximately 1 hour, for it to be impregnated with the liquid element, then placing this block for 2 days in a freezer to observe its behaviour in gel. It proved that the material of the block underwent no degradation.

Dyeing assays were performed by mixing a water tint with mixing water, and the colour of the block was completed on the whole of the mass.

I claim:

1. A block of compressed wood agglomerate, wherein said block comprises particles of wood and a hydraulic binder, and wherein said block is obtained by a process in which an initial mixture comprising particles of wood and a hydraulic binder is kept under pressure throughout the hardening period of the binder, and wherein the initial mixture comprises, for a total of 100% representing the volume of dry matter, from 75% to 95% of particles of wood and from 5% to 25% of hydraulic binder, and a quantity of water between 10% and 30% of the total volume of dry matter.

2. The block of compressed wood agglomerate as claimed in claim 1, wherein said block shows a density greater than 500 kg/m$^3$.

3. The block of wood agglomerate as claimed in claim 1, wherein said block has a resistance to punching compression greater than 3 mPa/5 cm$^3$.

4. The block of wood agglomerate as claimed in claim 1, wherein the particles of wood comprise wood chips.

5. The block of wood agglomerate as claimed in claim 1, wherein said block is produced from a mixture comprising, for a total of 100% representing the volume of dry matter, from 50% to 90% of wood chips, from 5% to 25% of fibre vegetable and from 5% to 25% of hydraulic binder, and a quantity of water between 10% and 30% of the total volume of dry matter.

6. The block of wood agglomerate as claimed in claim 1 or obtainable by a process for preparation of a block of wood agglomerate, comprising the steps consisting of forming or pouring in a mould a mixture comprising particles of wood and a hydraulic binder hydrated by water, the particles of wood representing at least 75%, of the total volume of dry matter of the initial mixture, then applying and maintaining the mixture under pressure while the binder hardens, wherein the mixture is moulded in a mould comprising a cover serving as pressing, and wherein the mould comprises blocking means of the cover at a determined height, wherein said block constitutes a partition element comprising on its periphery tongues or grooves to ensure binding with juxtaposed blocks.

7. The block of wood agglomerate as claimed in claim 6, wherein the partition element comprises two grooves made on an edge of two opposite lateral faces.

8. The block of wood agglomerate as claimed in claim 6, wherein the partition element comprises in its upper part a longitudinal channel which continues other horizontally juxtaposed elements with the channel.

9. A process for preparation of a block of wood agglomerate, comprising the steps consisting of forming or pouring in a mould a mixture comprising, for a total of 100% representing the volume of dry matter, from 75% to 95% of particles of wood and from 5% to 25% of hydraulic binder, and a quantity of water between 10% and 30% of the total volume of dry matter, then applying and maintaining the mixture under pressure while the binder hardens.

* * * * *